(12) United States Patent
Mashtizadeh et al.

(10) Patent No.: US 8,484,405 B2
(45) Date of Patent: Jul. 9, 2013

(54) MEMORY COMPRESSION POLICIES

(75) Inventors: Ali Mashtizadeh, El Cerrito, CA (US); Irfan Ahmad, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 180 days.

(21) Appl. No.: 13/182,306

(22) Filed: Jul. 13, 2011

(65) Prior Publication Data
US 2012/0036325 A1 Feb. 9, 2012

Related U.S. Application Data

(60) Provisional application No. 61/363,969, filed on Jul. 13, 2010.

(51) Int. Cl.
*G06F 12/12* (2006.01)
(52) U.S. Cl.
USPC ........ 711/6; 711/153; 711/160; 711/E12.046; 718/104
(58) Field of Classification Search
USPC .............. 711/6, 118, 136, 153, 160, E12.041, 711/E12.046; 718/104
See application file for complete search history.

(56) References Cited

U.S. PATENT DOCUMENTS

| | | | |
|---|---|---|---|
| 6,523,102 B1* | 2/2003 | Dye et al. ...................... | 711/170 |
| 7,433,951 B1* | 10/2008 | Waldspurger ................. | 709/226 |
| 2002/0073298 A1* | 6/2002 | Geiger et al. ................. | 711/206 |
| 2007/0245097 A1* | 10/2007 | Gschwind et al. ............ | 711/154 |
| 2011/0138147 A1* | 6/2011 | Knowles et al. .............. | 711/170 |

* cited by examiner

*Primary Examiner* — Hal Schnee (57) ABSTRACT

Techniques are disclosed for managing memory within a virtualized system that includes a memory compression cache. Generally, the virtualized system may include a hypervisor configured to use a compression cache to temporarily store memory pages that have been compressed to conserve memory space. A "first-in touch-out" (FITO) list may be used to manage the size of the compression cache by monitoring the compressed memory pages in the compression cache. Each element in the FITO list corresponds to a compressed page in the compression cache. Each element in the FITO list records a time at which the corresponding compressed page was stored in the compression cache (i.e. an age). A size of the compression cache may be adjusted based on the ages of the pages in the compression cache.

32 Claims, 6 Drawing Sheets

MEMORY COMPRESSION POLICIES

CROSS REFERENCE TO RELATED APPLICATIONS

This application claims priority to U.S. provisional application 61/363,969 filed Jul. 13, 2010 and entitled "Memory Compression Policies," which is hereby incorporated by reference.

BACKGROUND OF THE INVENTION

Computer virtualization is a technique that involves encapsulating a physical computing machine platform into a virtual machine that is executed under the control of virtualization software on a hardware computing platform, or "host". Consolidating multiple virtual machines onto a single host requires careful management and allocation of computing resources to each virtual machine. For example, a host system reserves a certain amount of physical memory for use by each virtual machine. Because of the memory management techniques the host may employ, the virtual machines can use more memory than the physical hardware platform has available. However, this can result in an "overcommitment". For example, the host may have 2 GB of physical memory and run four virtual machines with 1 GB memory each. In that case, the memory is overcommitted. Overcommitment may be an efficient use of resources in some cases because some virtual machines may be lightly loaded while others are more heavily loaded, and relative activity levels vary over time. Thus, even though 4 GB of memory is committed, actual memory use may remain below the physical 2 GB capacity.

A host may employ several techniques to improve memory utilization. For example, the host may re-allocate free memory from idle virtual machines to virtual machines that need more memory. In another technique, a host can employ swapping, a technique for freeing up physical memory by temporarily storing data from physical memory in secondary storage, in data blocks known as "pages". Due to the transfer speed of secondary storage, however, transferring data to and from secondary storage may be a costly operation.

SUMMARY OF THE INVENTION

As described herein, techniques are provided for managing memory pages in a computing system running one or more virtual machines. In one embodiment, a hypervisor determines an age of each of a plurality of compressed pages identified in a first-in, touch-out (FITO) list. The FITO list comprises a list of compressed pages stored in a compression cache, and each compressed page corresponds to a memory page of a virtual machine that has been compressed and stored in the compression cache. The hypervisor may adjust a size of the compression cache based on the determined ages of the plurality of pages in the compression cache. The hypervisor may also determine which pages in the compression cache have low utility and select those pages to be moved out of the cache into hard disk (or other location of a swap file).

Another embodiment of the invention includes a computer-implemented method for managing memory pages in a computing system running one or more virtual machines. This method may include adjusting both the size of the compression cache and a size of a balloon driver running within a virtual machine, wherein the balloon driver is used to determine the allocation of memory to the virtual machine. In one implementation, the adjustment of the size of the compression cache occurs after the adjustment to the balloon driver. For example, 500 MBs of memory can be reclaimed by first inflating the balloon to free 400 MBs of memory and then increasing the compression cache to accommodate addition compressed pages, such that 100 MBs are freed as a function of the compression ratio. In an alternative implementation, the two adjustments are performed simultaneously. The advantage of this alternative implementation is that we avoid removing as many pages from the guest OS, that may induce guest level swapping or reduction of guest caching abilities. Moreover, this implementation at least partially avoids placing the guest operating system of the virtual machine under any significant memory pressure by using the compression cache for some pages that are lightly used by the guest.

Other embodiments include, without limitation, a computer-readable medium that includes instructions that enable a processor to implement one or more aspects of the disclosed methods as well as a system configured to implement one or more aspects of the disclosed methods.

DETAILED DESCRIPTION

Embodiments of the invention provide techniques for managing memory within a virtualized system. Generally, a hypervisor may maintain a compression cache used to temporarily store memory pages that have been compressed to conserve space. That is, a number of pages may be compressed, stored in memory, and later retrieved and decompressed, based on the memory needs of a virtual machine executing on the system. The compression cache is useful in situations in which an application or data of a virtual machine does not fit within the memory space allocated to that virtual machine. Should additional temporary storage of memory pages be needed, the system may swap pages from memory to disk. However, swapping pages to disk is typically an expensive operation (in terms of time). Accordingly, a less-expensive compression operation is preferred before resorting to swap. As such, using the techniques described below (before swapping pages to disk) may significantly improve page-fault latency. At the same time, the compression cache consumes memory resources that could otherwise be allocated to active processes. Thus, it is important to determine an appropriate size of the compression cache. For example, if pages remain in the compression cache after long periods of time, it may be useful to swap such pages out to disk and reduce the size of the compression cache. Embodiments of the invention may be used to determine a size of the compression cache that balances the amount of free memory available for use by the virtual machine with the memory available to temporarily store pages before the pages are swapped to disk. Generally, when increased compression cache pressure is detected, the compression cache should swap out more pages, while an increase in swap pressure means that the compression cache should increase in size. Additionally, a least recently used methodology may be used to swap out the most stale pages from the compression cache.

In one aspect, a "first-in touch-out" (FITO) list may be used to manage the size of the compression cache by monitoring the compressed memory pages in the compression cache. Elements in the FITO list correspond to compressed pages in the compression cache. Each element in the FITO list records a time at which the corresponding compressed page was stored in the compression cache (i.e. an age). The FITO list is ordered according to the least recently used compressed pages. As such, the FITO list reflects a history of the contents of the compression cache.

In one embodiment, the system determines whether to modify the allocated size of the compression cache using the FITO list. For example, if the elements in a FITO list have a relatively equal young age, then this suggests that the system is retrieving compressed pages shortly after the pages are stored in the compression cache. In other words, compressed pages are being rapidly cycled in and out of memory and are benefiting from using the compression cache as a form of temporary storage. In such a case, the system may increase the allocated size of the compression cache (or increase the allocation of memory to the virtual machine) to permit the storage of more compressed pages (or reduce the need for compressed pages). In another example, a FITO list having relatively young elements at the beginning of the list and relatively old elements at the end of list suggests that some compressed pages have remained in the compression cache without being needed again by the virtual machine. In such a case, the system may swap some specified number of the older pages to disk and decrease the allocated size of the compression cache, resulting in more memory being available to the virtual machine.

In another aspect, the adjustment in the size of the compression cache may be used in conjunction with adjustments by a balloon driver running in the virtual machine. As known by persons skilled in the art, the balloon driver may be employed to increase (or decrease) memory pressure on the guest operating system in the virtual machine. As a result of the increased memory pressure, the guest operating system may begin swapping memory pages to disk. The memory that is freed by swapping the memory pages may then be reclaimed for use by other virtual machines. In accordance with one aspect of the invention, rather than relying solely upon operation of the balloon driver to implement a change in memory utilization, compression cache is also adjusted. Thus, in the case in which memory is to be freed, the balloon is inflated and the compression cache is increased. As one option, the balloon driver is adjusted prior to the adjustment of the compression cache. Alternatively, the two adjustments are performed simultaneously, so that the increase in memory pressure is at least partially absorbed by the increased ability to compress pages for storage in the compression cache.

As an example of the adjustments of the balloon driver and the size of compression cache, the target may be to reclaim 500 MBs of memory. The balloon may grow, but may be limited to increasing memory pressure by 400 MBs. This increase will result in the guest operating system swapping of memory pages to the disk. Then, the remaining 100 MBs could be reclaimed using the adjustment in the size of compression cache (as a function of 1/compression ratio). As noted, the alternative is to perform the two adjustments simultaneously, Then, reclaiming the 500 MBs of memory may involve balloon inflation to reclaim 400 MBs and compression cache expansion to reclaim 100*(1/compression ratio).

Additionally, an intermediate layer may be used between physical memory and hard disk when swapping. A traditional memory hierarchy includes processor registers, L1-3 caches, main memory, disk storage, and tertiary storage. Each layer in the memory hierarchy represents a difference in response time (i.e. main memory is faster than disk storage.) Memory pages unused in one layer may be transferred to a lower level in the memory hierarchy. For example, memory pages residing in main memory that are not well-used may be temporarily swapped to disk storage to make more main memory available.

In one embodiment, a solid-state disk (SSD) may be inserted as a new layer in the existing memory hierarchy. A SSD is a storage device that uses solid-state memories to persistently store data. The SSD emulates a traditional hard disk drive by providing a similar standard interface (e.g. SATA), but provides greater levels of performance and speed compared to I/O operations of a hard disk. The compression-before-swap technique discussed above may be combined with a swap-to-SSD technique to achieve better performance and provide very high levels of memory overcommit.

Figure 1:
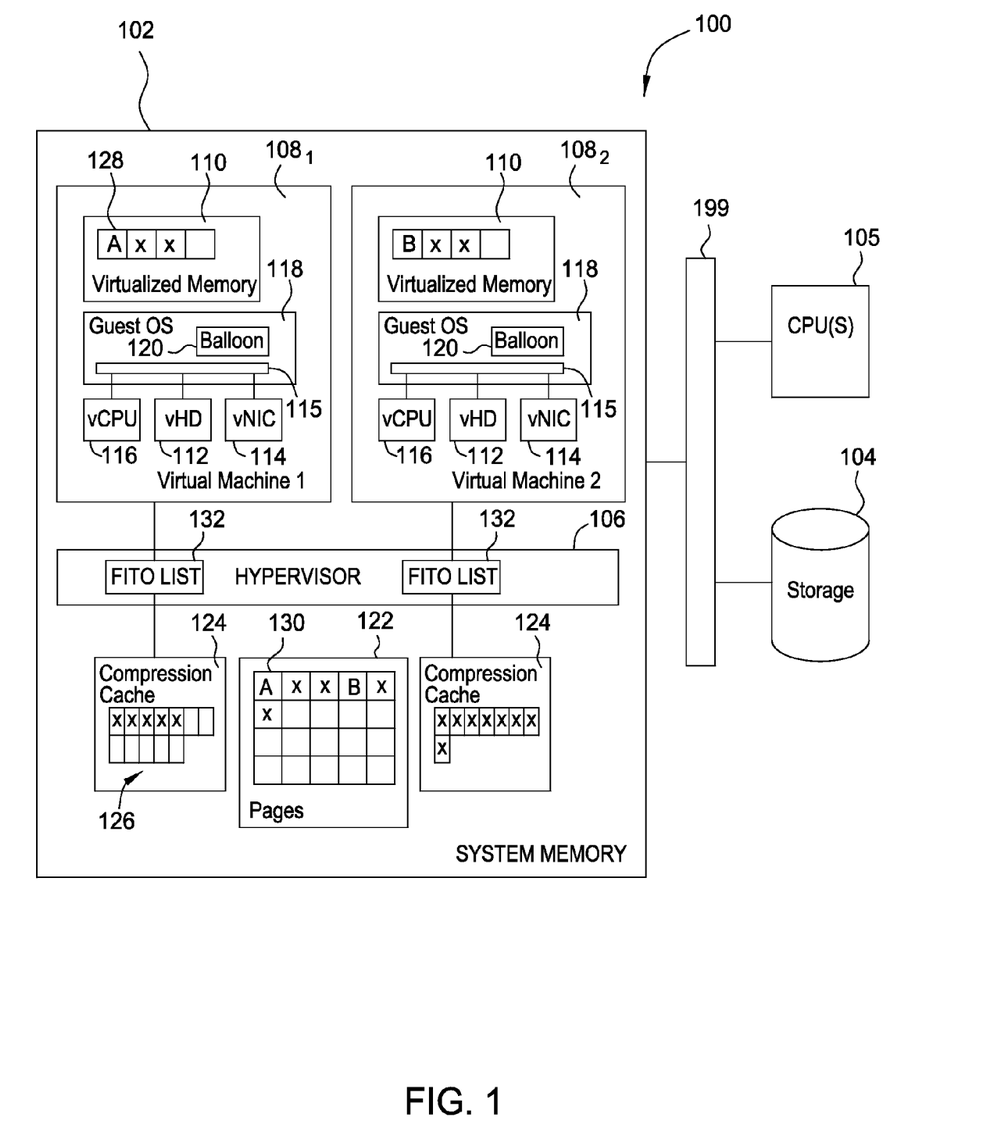
FIG. 1 is a block diagram of various hardware components and software components of a computer system in which one or more aspects of the invention may be implemented.

FIG. 1 depicts a functional block diagram of a computer system 100 in which embodiments of the invention may be practiced. Computer system 100 may be constructed on a server-class, hardware platform including platform processor 105, system memory 102, secondary storage 104, a bus 199, and other standard peripheral components (not separately shown). The computer system 100 may be provided with any amount of system memory 102 (also referred to herein as "physical memory" or random access memory (RAM)). The system memory 102 stores data and software such as an operating system and currently running application programs. Typically, the system memory 102 stores the data and the software that is currently active, whereas the secondary storage 104 stores the data and the software that has been used less recently.

Secondary storage 104 generally stores data and software, such as additional application programs, in the form of hard disk drives (HDDs), read only memory (ROM), floppy disks, tape, CD-ROM, etc. In one embodiment, the secondary storage 104 may include a swap file (not shown). The computer system 100 may temporarily store and retrieve data in the HDD swap file for use in physical memory 102.

Secondary storage 104 may also include a solid-state drive (SSD). As discussed above, a SSD is a storage device that uses solid-state memory to store persistent data. Compared to traditional HDDs, SSDs have lower access time and latency, and consume less power. SSDs may be DRAM-based, flash-memory-based, or even Phase Change Memory- (PCM-) based devices. In one embodiment, the computer system 100 may temporarily store and retrieve (i.e. swap) data in the SSD for use in physical memory 102. Additionally, the computer system 100 may swap data from the SDD to the HDD swap file. In another embodiment, SSDs may be used as I/O read/write caches.

The computer system 100 is responsible for managing a virtual memory for each of the separate processes that are running in the computer system 100. Each of the virtual memory address spaces and the physical memory address spaces are divided into blocks of contiguous memory addresses referred to as pages 122, and page tables provide a mapping of the virtual memory pages to the physical memory pages. In one embodiment, page sizes include 4 kB (default page size) and 2 MB (large page size) and the page sizes may vary among the pages. Each address may be decomposed into a page number, which is the lowest of the addresses in a contiguous block of memory represented by the page, and an offset within that page.

In at least one embodiment, system memory 102 may include compression caches 124. Within each such embodiment, each compression cache 124 is uniquely associated with a particular virtual machine running in the computer system 100. As described in greater detail below, each compression cache 124 temporarily stores memory pages in a compressed format. A hypervisor 106, also described below, manages the compression caches 124. The compression cache 124 represents a level in the memory hierarchy, ahead of swapping pages to disk. To make space available in system memory 102, pages 122 may be compressed and stored in a compression cache area in system memory 102. For example, compression cache 124 may store individual 4 KB pages that have been compressed into fixed 2 KB fractional pages. If a compressed page 126 is requested by the hypervisor 106, the page 126 may be removed from the compression cache 124, decompressed, and stored in a space in memory 102 corresponding to a virtual address space of the virtual machine. Should more available memory be requested, compressed pages 126 may also be removed from the compression cache and swapped to disk. In one aspect, the size of the compression cache may be fixed and pre-determined. In another aspect, the size of the compression cache may be dynamically determined by the hypervisor 106, according to the characteristics of the workload of the compression cache 124. As described in greater detail below, the hypervisor 106 may decrease (or increase) the size of the compression cache if the hypervisor determines the compression cache is under-used (or over-used) by evaluating how long compressed pages have remained in the compression cache (as determined using the FITO list). As such, each compression cache 124 in computer system 100 may have allocated a different size. For example, a compression cache for a first virtual machine may be allocated 256 MB for use, while another compression cache for a second virtual machine may be allocated 128 MB. While the compression caches 124 have been discussed as existing within system memory 102, it is recognized that the compression caches 124 may be stored on a separate storage device or within a separate memory (which may include flash memory, DRAM memory, and network storage devices, such as a NAS or SAN, etc.)

A hypervisor 106 (also referred to as a virtualization software layer) is installed on the hardware platform and supports a virtual machine execution space within which multiple virtual machines (VMs) $108_1$-$108_2$ may be concurrently instantiated and executed. For each of VMs $108_1$-$108_2$, hypervisor 106 manages a corresponding virtual hardware platform that includes emulated hardware such as virtual hard drive 112, virtual NIC 114, virtual CPU 116 and guest physical RAM 110. For example, a virtual hardware platform may function as an equivalent of a standard x86 hardware architecture such that any x86 supported operating system, e.g., a version of Microsoft Windows, a Linux distribution, Solaris x86, NetWare, FreeBSD, etc., may be installed as a guest operating system 118 to execute any supported application in application layer for each VM.

Of course, one of ordinary skill in the art will recognize that the various terms, layers and categorizations used to describe the virtualization components in FIG. 1 may be referred to differently without departing from their functionality or the spirit or scope of the invention. For example, virtual hardware platforms may be considered to be part of virtual machine monitors (VMM) $108_1$-$108_2$ which implement the virtual system support needed to coordinate operations between hypervisor 106 and the respective VMs. Alternatively, virtual hardware platforms may also be considered to be separate from VMMs, and VMMs may be considered to be separate from hypervisor 106. One example of hypervisor 106 is the hypervisor included as a component of VMware's ESX® product, for example, VMware's VMkernel™, which is commercially available from VMware, Inc. of Palo Alto, Calif. Further, it should be recognized that other virtualized computer systems are contemplated, such as hosted virtual machine systems, where the hypervisor is implemented in conjunction with a host operating system.

Device driver layers 115 in guest operating system 118 of VMs $108_1$-$108_2$ include device drivers that interact with emulated devices in virtual hardware platform as if such emulated devices were the actual physical devices. Hypervisor 106 is responsible for taking requests from such device drivers and translating the requests into corresponding requests for real device drivers in the device driver layer of hypervisor 106. The device drivers in device driver layer 115 in effect communicate with real devices in the hardware platform. In addition, for each of VMs $108_1$-$108_2$, hypervisor 106 allocates a virtual memory address space to the corresponding virtual machine process. Additionally, the hypervisor 106 may maintain metadata about pages within each virtual memory address space for a given virtual machine. The metadata indicates whether a page within the virtual memory address space for a given virtual machine is mapped to a location in system memory 102, is shared with other virtual machine processes, has been swapped out to a swap device allocated for use by host computer system 100, etc. For example, page 128 within virtual memory space maps to a page 130 within physical memory, and data stored in page 128 ('A') is stored in page 130.

In one embodiment, the guest operating system 118 includes a memory balloon driver 120. The balloon driver 120 collaborates with the server to reclaim pages that are considered less commonly used by the guest operating system 118. The balloon driver 120 behaves like a native program that requires more and more memory. The balloon driver 120 effectively increases (or decreases) memory pressure on the guest operating system 118, causing the guest to invoke its own memory management algorithms. When memory use is high, the guest operating system 118 decides which particular pages to reclaim and, if necessary, swaps them to its own virtual disk.

The hypervisor 106 may manage a first-in touch-out (FITO) list 132 for each virtual machine 108. Further, the hypervisor 106 may analyze each FITO list 132 to determine workload characteristics of each compression cache 124 and determine a target size of the compression cache 124 based on the workload characteristics. As noted, the FITO list 132 tracks compressed pages 126 within the compressed cache 124. In one aspect, a FITO list 132 is an ordered linked-list structure that is structured independently of the compressed pages. Elements in a FITO list 132 correspond to a compressed page 126. An element in a FITO list 132 may include a timestamp indicating the date and time of entry a compressed page was entered into the compression cache. An element in a FITO list 132 may also include a reference to a corresponding compressed page 126. In one embodiment, the FITO list 132 may be maintained in a least recently used (LRU) order. When a compressed page 126 is added to the compression cache 124, the hypervisor 106 adds a corresponding element to the beginning of the FITO list 132. If a target compressed page 126 is accessed, removed, decompressed, and restored to the virtual machine 108 (i.e. "touched"), the hypervisor 106 removes the page's corresponding element from the FITO list 132. This process continues, with pages cycling in and out of the compression cache, as memory pressure within the virtual machine fluctuates. Accordingly, elements in the FITO list 132 are ordered according to the age of their corresponding compressed page 126 in the compression cache 124: newer pages are in the beginning of the list, and older pages are in the end of the list.

In one embodiment, the hypervisor 106 may use the FITO list 132 to manage the size of the compression cache. For example, the hypervisor 106 may analyze the age of the compressed pages in the FITO list to select candidates for swapping to disk. In one aspect, compressed pages that have remained in the compression cache for a period of time relatively longer than other compressed pages may be strong swap candidates. For example, the hypervisor 106 may compare the age of the entries in the beginning of the FITO list and entries at the end of the FITO list, and if the pages at the end of the list exceed a predetermined difference—such pages may be swapped to disk. In another aspect, the hypervisor 106 may analyze a graph of ages of compressed pages in the FITO list. Overall, the duration that compressed pages remain in the compression cache (i.e. their "age") indicates whether the compression cache is being effectively used by the hypervisor.

Figure 2:
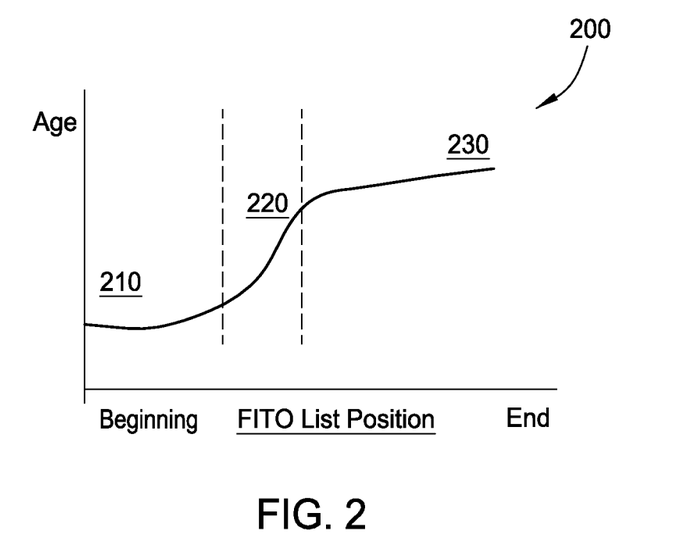
FIG. 2 is a diagram that graphically illustrates pages in an exemplary compression cache.

FIG. 2 illustrates a graph 200 of ages of the compressed pages in a FITO list as a function of the position of the compressed pages in the FITO list. The term "age" generally indicates how long a compressed page has remained in the compression cache. As shown, the age of each compressed pages in the FITO list is measured on the Y-axis. The position of each compressed page within the FITO list is measured on the X-axis. Section 210 of the graph 200 reflects the relatively less time that compressed pages in the beginning of the FITO list have been in the compression cache. Section 230 of the graph 200 indicates the relatively greater time that the compressed pages at the end of the FITO list have been in the compression cache. Section 220 of the graph 200 shows a rapid rise in the age of compressed pages. According to one aspect of the invention, a sharp curve in the graph 200, for example as seen in section 220, may indicate a significant event or change in workload of the virtual machine that would suggest the compressed pages in section 230 are unlikely to be accessed in the immediate future. For example, compressed pages in section 220 may have been "touched" and removed from the FITO list, creating the upward curve. In another example, a significant amount of time may have passed between entry of compressed pages in section 230 and entry of compressed pages in section 210, creating the curve.

Figure 3:
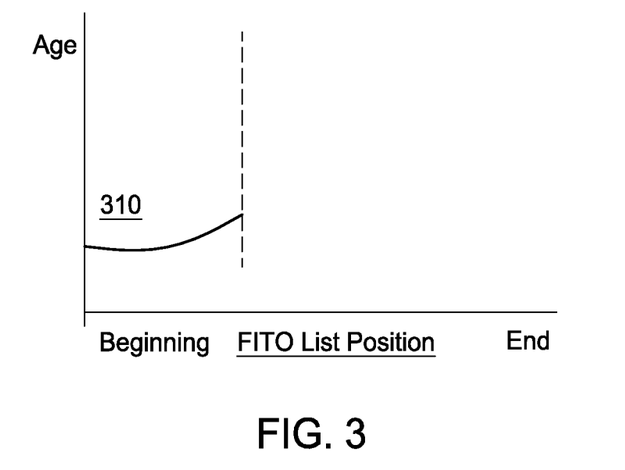
FIG. 3 is another diagram that graphically illustrates pages in an exemplary compression cache.

As such, the hypervisor 106 may select the compressed pages indicated in sections 220 and 230 of the graph 200 as swap candidates. An analysis of the section 220 suggests that those compressed pages in sections 220 and 230 are infrequently accessed (or are unlikely to be accessed soon) relative to other compressed pages, and as a result, their value within the compression cache is less than other compressed pages. According to another aspect, a linear or near-linear graph may indicate there are not any strong swap candidates. FIG. 3 illustrates the FITO list positions of pages in the FITO list of FIG. 2 after the hypervisor 106 has swapped the compressed pages in sections 220 and 230 to disk. In one aspect, the hypervisor 106 may reduce the size of compression cache to a size sufficient to contain the remaining compressed pages in section 310. Reducing the size of the compression cache frees memory that may be used by the virtual machine or re-assigned by the hypervisor 106 to another virtual machine.

Figure 4A:
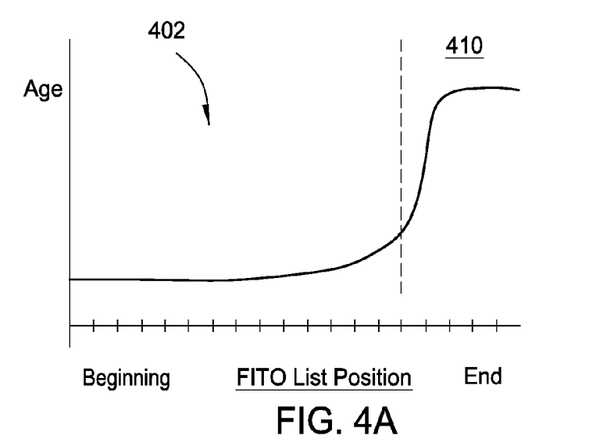
FIG. 4A-C are graph diagrams that illustrate different scenarios of pages in an exemplary compression cache according to an embodiment of the invention.
Figure 4B:
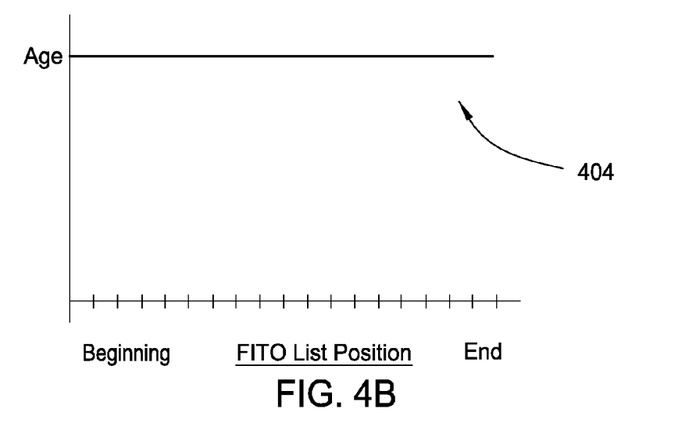
Figure 4C:
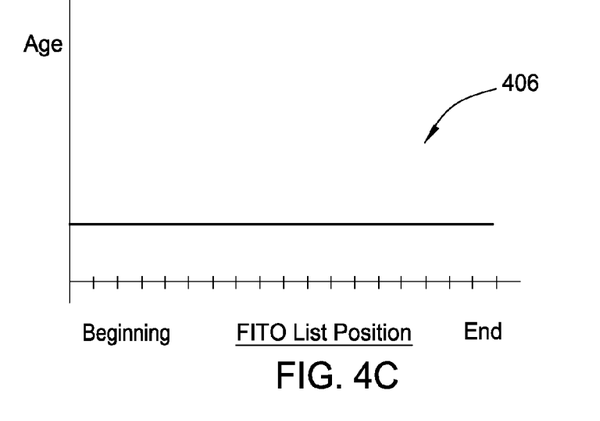

FIGS. 4A-C illustrate graphs 402, 404, 406 plotting ages of the compressed pages in a FITO list as a function of the position of the compressed pages in the FITO list. Each graph represents a different scenario of compressed pages in the FITO list. In FIG. 4A, the compressed pages in the beginning of the FITO list are younger than the compressed pages at the end of the FITO list. Accordingly, a hypervisor 106 may conclude that the older compressed pages are unlikely to be accessed soon by the virtual machine, and thus, should be swapped out to disk. Further analysis by the hypervisor 106 indicates that only a small portion of the compressed pages in region 410 are significantly older than the other compressed pages. As such, few compressed pages will be swapped out, and the size of the compression cache would be reduced slightly by swapping these pages.

In graph 404 depicted in FIG. 4B, elements at the beginning and at the end of the FITO list have an old age, for example, on the order of magnitude of minutes. This scenario indicates that the compressed pages in the compression cache of this virtual machine have not been accessed recently and are not likely to be accessed soon. As such, the hypervisor 106 may swap out many compressed pages to disk and reduce the size of the compression cache accordingly.

In graph 406 illustrated in FIG. 4C, elements at the beginning and at the end of the FITO list have a young age, for example, on the order of magnitude of seconds. This scenario indicates that compressed pages are being cycled in and out of the compression cache, spending very little time in temporary storage. This scenario also indicates that pages bumped from the compression cache are being swapped. As such, the hypervisor 106 may increase the size of the compression cache to store more compressed pages and in an effort to reduce latency caused by swapping.

Figure 5:
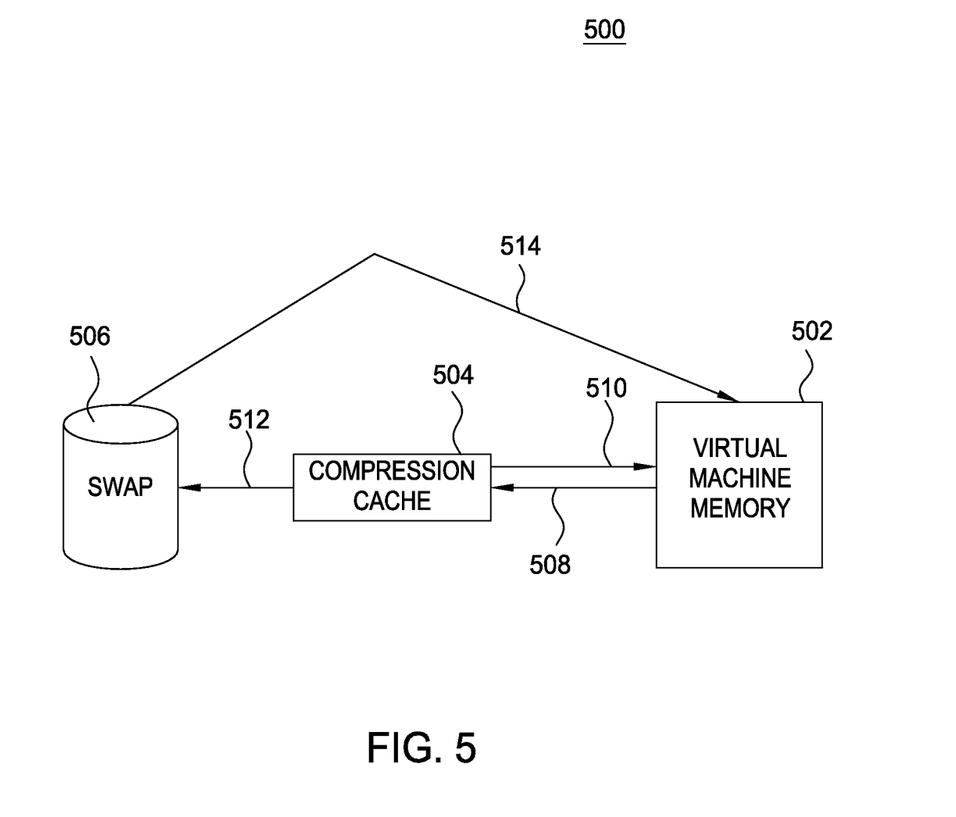
FIG. 5 is a block diagram illustrating a relationship between a swap disk, physical memory, and an exemplary compression cache according to an embodiment of the invention.

Thus, in one embodiment, the hypervisor 106 adjusts the size of the compression cache based on an evaluation of how long pages have remained in the compression cache (i.e., whether the pages are compressed and later "touched" out or compressed and then simply remain in the compression cache for long periods of time). In an alternative embodiment, the hypervisor 106 may manage the size of the compression caches by analyzing memory hierarchy flow rates. For example, FIG. 5 depicts a memory system 500 including virtual machine memory 502, compression cache 504, and a swap disk 506. Virtual machine memory 502 contains uncompressed pages of data in use by a virtual machine. A virtual machine may load data or programs into virtual machine memory 502. As memory needs increase, a hypervisor may make memory available by pulling pages of data from virtual machine memory 502, compressing the pages, and storing the compressed pages in a compression cache 504, via a data pathway 508. When the virtual machine requests data that is contained in a compressed page, the hypervisor retrieves the compressed page from the compression cache 504, via data pathway 510. When the compression cache needs more memory, the hypervisor may swap pages of data from the compression cache 504 to the swap disk 506 via data pathway 512. The hypervisor may swap in pages from the swap disk into virtual machine memory 502, via data pathway 514.

In one embodiment, the hypervisor may analyze the bandwidth, or flow rates of data pathways 508, 510, 512, 514 to determine the workload characteristics of the system 500. For example, a rise in compression cache throughput across data pathways 508, 510 suggests that more pages are coming from the compression cache 504 to in-core memory. As such, the hypervisor 106 could swap more pages of data to the swap disk 506 or decrease the size of the compression cache 504 to provide more memory to the virtual machine (i.e. to increase the size of virtual machine memory 502.) In another example, a rise in swap-in across data pathway 514 suggests that the hypervisor should increase the target size of the compression cache 504. In yet another example, an increase of both compression cache throughput across data pathways 508, 510, and swap-in/-out across data pathways 512, 514 suggests that the memory needs of the system are more than is available from the memory 502 or compression cache 504, and that the hypervisor may grow the compression cache 504.

In each of these scenarios, the hypervisor 106 dynamically adjusts the size of the compression cache. Doing so provides the benefit of matching the size of the compression cache to the memory needs of the virtual machine. The compression cache provides temporary storage to memory pages that would otherwise be temporarily stored in the HDD swap file. A compression cache that is too small would result in memory pages constantly being cycled in and out of the compression cache and the swap disk (a time-costly scenario). A compression cache that is too large would result in under-used memory space that would be better served as active memory for a virtual machine. It is noted that one skilled in the art would recognize that this example can be adapted for a variety of resource hierarchies, for example, using a cache hierarchy. It is also noted that the technique of adjusting the compression cache size based on analysis of memory hierarchy flow rates may be used together with the approach described above that is based on the age of pages in the compression cache.

A person skilled in the art will recognize the availability of different methods of using FITO lists to determine the size of the compression cache, such that the different methods are within the scope of the claimed invention.

Figure 6:
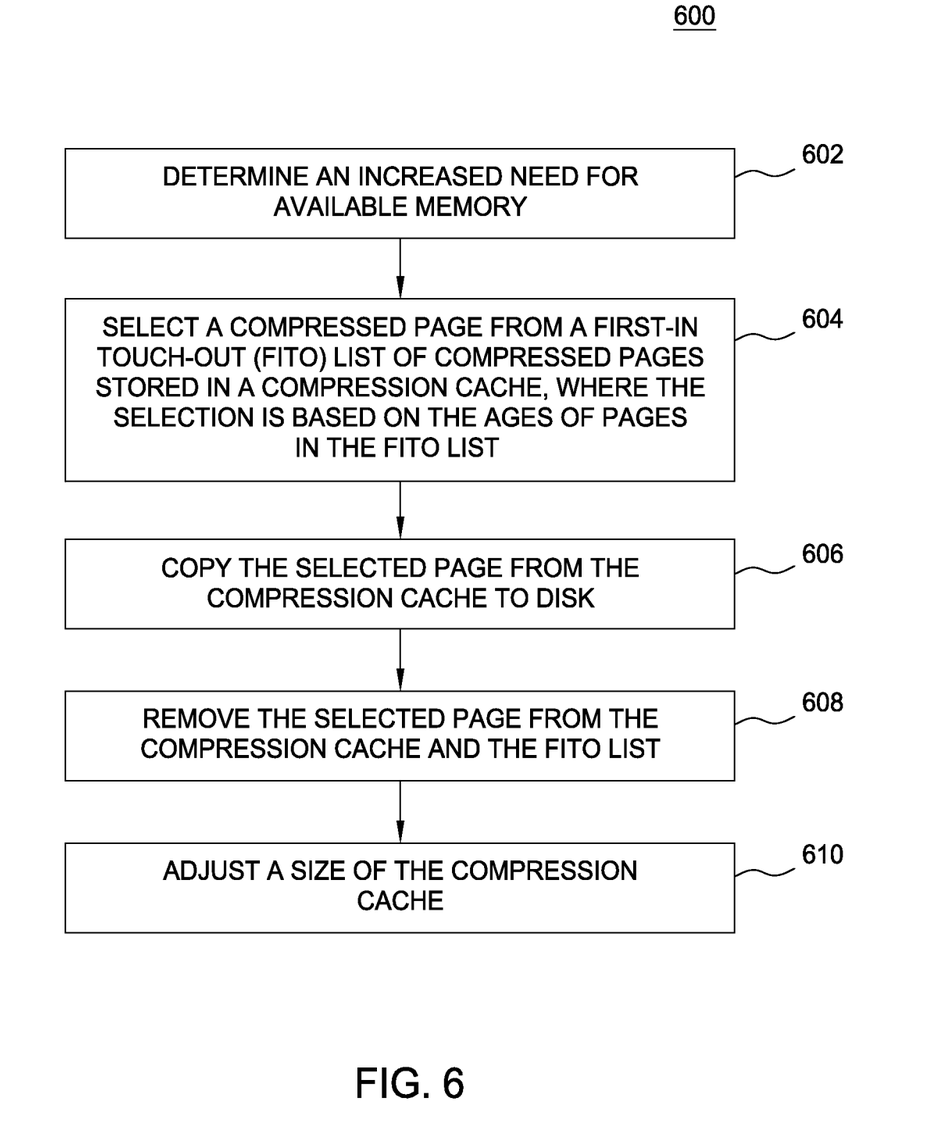
FIG. 6 illustrates a method for managing the size of a compression cache, in accordance with an embodiment of the invention.

FIG. 6 is a flow diagram of a method 600 for managing memory resources in a virtualized environment, according to one embodiment of the invention. Although the method steps are described in conjunction with the computer system 100 of FIG. 1, any system that performs the method steps is within the scope of the invention.

As shown, the method 600 begins at step 602, where a hypervisor determines an increased need for memory in one of a set of VMs managed by a hypervisor. For example, a VM may launch several processes at once. In another example, a hypervisor may launch a new virtual machine, or a running application may simply require additional memory in the normal course of its operations.

At step 604, the hypervisor may select one or more compressed pages from a FITO list of compressed pages stored in a compression cache. In one embodiment, the hypervisor may select compressed pages that have been stored in the compression cache for the longest period of time, as indicated by the FITO list (e.g., the oldest five pages). In another embodiment, the hypervisor may select a compressed page at the end of the FITO list, where the age of the first entry is less than the age of the last entry in the FITO list. In yet another embodiment, the hypervisor may select compressed pages at the end of the FITO list, where ages of pages in the FITO list begin to substantially increase (e.g., pages in the region 410 shown in FIG. 4A). At step 606, the hypervisor may copy the selected page from the compression cache to the swap disk. In one aspect, the hypervisor may transfer a compressed page from the compression cache to a portion of temporary memory. The hypervisor may then write the decompressed page to a swap file in secondary storage.

At step 608, the hypervisor may remove the selected page from the compression cache and from the FITO list. The hypervisor can reserve the space in memory for storage of additional compressed pages. The hypervisor may also remove the element corresponding to the selected (and now removed) compressed page from the FITO list. In one embodiment, the hypervisor may delete the linked list structure element corresponding to the selected compressed page.

At step 610, the hypervisor may adjust the size of the compression cache. In one embodiment, the hypervisor reduces the amount of memory reserved for the compression cache (i.e. the size of the compression cache) if the hypervisor determines some compressed pages have remained in the compression cache for a period exceeding a predefined mount of time (e.g., pages may be evicted from the compression cache following a specified number of minutes). This scenario may occur where some compression pages listed at the end of the FITO list have been in the compression cache for a substantially longer time than the compression pages listed in the beginning of the FITO list.

In the same or another embodiment, the hypervisor may increase the amount of memory reserved for the compression cache if the hypervisor determines that compressed pages are cycling in and out of the compression cache too quickly to appreciate the benefit of temporary storage (i.e. caching). That is, if pages are compressed, stored in the compression cache, and than ultimately swapped to disk at a relatively young age, the size of the compression cache may be increased to allow pages to remain in the compression cache for a longer period of time, increasing the chances that a given page will be "touched" before being swapped to disk. The hypervisor may observe this scenario, for example, when all of the pages stored in the compression cache have a relatively young age (e.g., on the order of a few seconds). Alternatively, this may occur when the working set of the VM is larger then the memory currently allocated to that VM. In such a case, the hypervisor may elect to increase the memory allocated to the VM, resulting in fewer pages cycling through the compression cache.

Figure 7:
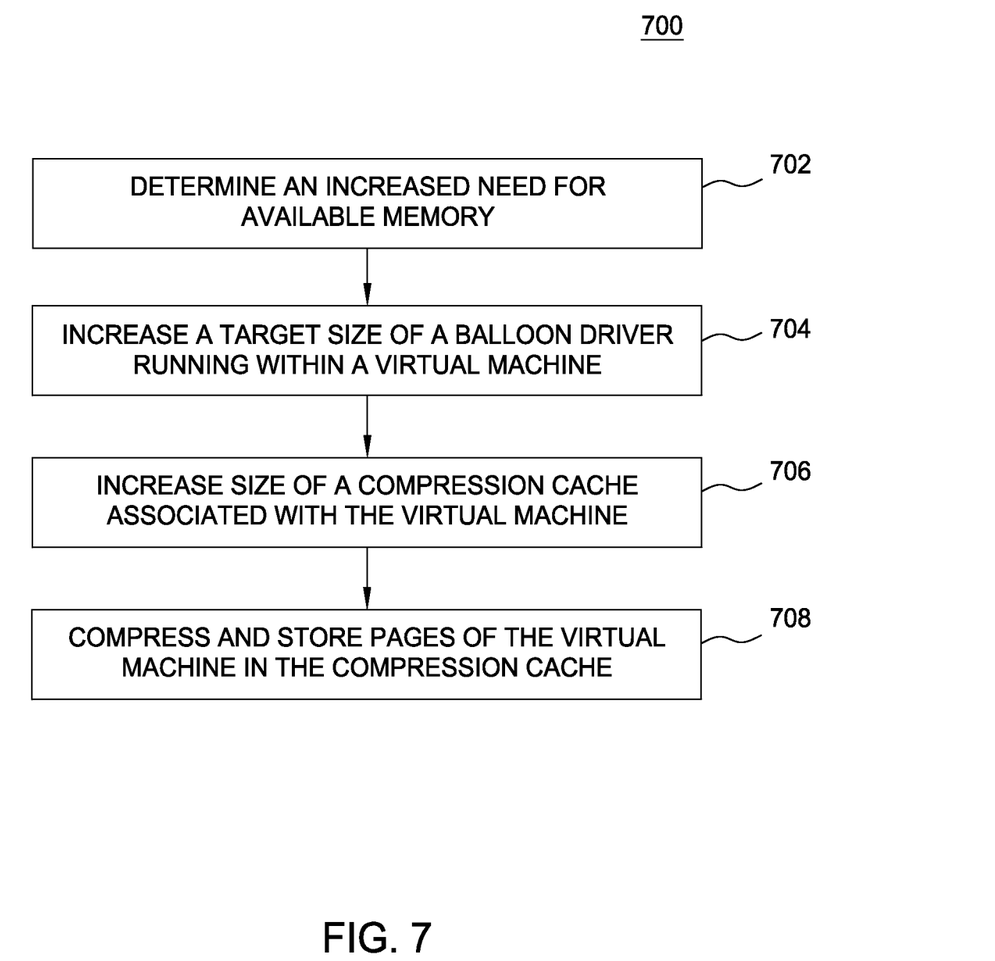
FIG. 7 illustrates a method for managing memory in a virtual machine using a compression cache in accordance with an embodiment of the invention.

FIG. 7 is a flow diagram of another method for managing memory resources in a virtualized environment according to one embodiment of the invention. The hypervisor may perform method 700 in conjunction with a balloon driver used to increase memory pressure within the guest operating system. As shown, the method 700 begins at step 702, where the hypervisor determines a need for available memory. As described above, the hypervisor may detect an increase in need for available physical memory if a virtual machine launches new processes or a running process (or VM) increases a demand for memory resources. Say, for example, a hypervisor determines that a given virtual machine requires 512 MB of additional memory. At step 704, the hypervisor may increase the target size of a balloon driver running within the guest operating system of a virtual machine.

As noted, the balloon driver is used to effectively reclaim memory from a virtual machine, as it causes the VM to reclaim memory that is considered least valuable by the guest operating system. The system "inflates" the balloon driver to increase memory pressure within the virtual machine, causing the guest operating system to invoke its own memory management processes. In response, the guest operating system identifies which particular pages of memory may be reclaimed, and if necessary, swaps them to a virtual disk. Continuing with the example of a need for 512 additional MBs of memory, the hypervisor may increase the target size of the balloon driver by a portion of the requested 512 MB of memory. The resulting increase in memory pressure typically results in the guest operating system swapping memory pages to disk.

At step 706, the hypervisor may increase the size of a compression cache associated with the virtual machine. Again, using the example discussed above, the hypervisor may increase the size of the compression cache by the remaining portion of the requested memory not satisfied by the memory pressure exerted by the balloon driver. For example, if the request memory target is 512 MB, and the balloon driver increases its target size to 256 MB, the hypervisor may increase the size of the compression cache by an amount calculated to make available the remaining needed 256 MB. That is, the increased size of the compression cache must account for the fact that the compressed pages to be stored in the compression cache still occupy some space in physical memory. Specifically, the compression cache may be increased by an amount equal to the remaining target size raised by a factor of the compression ratio. Using the example discussed above, the hypervisor may compress pages equaling 256 MB*(1/(compression ratio)). It is noted that the increase in the size of compression cache as described this embodiment, may not be required because the memory scheduler of the system may iteratively converge on the target size. At step 708, the hypervisor may compress and store pages of the virtual machine in the compression cache. In one embodiment, the increase of memory pressure by the balloon driver causes the guest operating system in the virtual machine to swap memory pages to disk. Instead, the virtual machine can store the memory pages in the compression cache where the cost of retrieval of the pages is significantly less than the cost of retrieval from disk. Accordingly, the hypervisor may compress and store those memory pages in the compression cache.

In sum, embodiments of the invention provide techniques for managing memory within a virtualized system that includes a memory compression cache. Generally, the virtualized system may include a hypervisor configured to use a compression cache to temporarily store memory pages that have been compressed to conserve memory space. That is, a number of pages may be compressed, stored in memory, and later retrieved and decompressed, based on the memory needs of the virtual machine. A size of the compression cache may be optimized based on the ages of the pages in the compression cache In another embodiment, the compress-before-swap and swap-to-SSD-before-disk techniques described above may be combined, providing a high level of memory overcommit capacity. For example, the compression cache may be treated as a "victim cache," such that a small number of pages may be kept compressed in memory. Pages evicted from the compression cache may be sent to the SSD from, which they can eventually be evicted to the hard disk. Pages stored in the SSD swap file from the compression cache may also be compressed in order save space and allow for quicker retrieval.

While the foregoing is directed to embodiments of the present invention, other and further embodiments of the invention may be devised without departing from the basic scope thereof, and the scope thereof is determined by the claims.

What is claimed is:

1. A method for managing memory pages in a computing system running one or more virtual machines, the method comprising:
   monitoring utilization of memory allocated to a virtual machine;
   detecting a condition in which adjustment of the allocated memory is to be initiated;
   as a response to detection of the condition, determining an age of each of a plurality of compressed pages stored in a compression cache, wherein each compressed page is a memory page that has been compressed and stored in the compression cache and wherein the age of a compressed page is a time during which the compressed page has been resident within the compression cache; and
   further in response to the detection of the condition, adjusting a size of the compression cache based on the determined ages of the plurality of pages in the compression cache.

2. The method of claim 1, wherein determining the age of each of the compressed pages includes accessing a first-in, touch-out (FITO) list that comprises a list of the compressed pages stored in the compression cache.

3. A method for managing memory pages in a computing system running one or more virtual machines, the method comprising:
   determining an age of each of a plurality of compressed pages identified in a first-in, touch-out (FITO) list, wherein the FITO list comprises a list of compressed pages stored in a compression cache, and wherein each compressed page corresponds to a memory page of a virtual machine that has been compressed and stored in the compression cache; and
   adjusting a size of the compression cache based on the determined ages of the plurality of pages in the compression cache.

4. The method of claim 3, wherein adjusting the size of the compression cache comprises reducing the size of the compression cache.

5. The method of claim 4, wherein determining the age of each of a plurality of compressed pages identified in the FITO list, comprises determining that one or more entries at a beginning of the FITO list differ in age from one or more entries at an ending of the FITO list by more than a specified amount.

6. The method of claim 5, wherein the method further comprises storing pages corresponding to the one or more entries at the ending of the FITO list within a swap file and removing the pages from the compression cache.

7. The method of claim 6, wherein the swap file is within a swap-device that comprises one of a hard disk drive, a solid-state drive, a flash memory component, a NAS, a SAN or other network storage device.

8. The method of claim 3, wherein adjusting the size of the compression cache comprises increasing the size of the compression cache.

9. The method of claim 7, wherein determining the age of each of a plurality of compressed pages identified in the FITO list comprises determining that one or more entries at a beginning of the FITO list differ in age from one or more entries at an ending of the FITO list by less than a specified amount.

10. The method of claim 3, wherein the FITO list orders pages based on the age of the compressed pages stored in the compression cache.

11. The method of claim 3, wherein the compression cache is stored in a device separate from a system memory storing the memory pages.

12. A method for managing memory pages in a computing system running one or more virtual machines, the method comprising:
   setting a target condition of memory allocation for a virtual machine;
   adjusting a size of a balloon driver running within the virtual machine, wherein the size of the balloon driver determines consumption of memory allocated to the virtual machine, the adjusted size of the balloon driver calculated to achieve a first portion of the target condition of memory allocation for the virtual machine; and adjusting a size of a compression cache of the virtual machine, wherein the compression cache stores compressed memory pages for access by a guest operating system of the virtual machine, the adjusted size of the compression cache calculated to achieve a remaining portion of the target condition of memory allocation for the virtual machine, wherein the first portion and the remaining portion together achieve the target condition of memory allocation for the virtual machine.

13. A non-transitory computer-readable storage medium storing a program, which, when executed by a processor performs an operation for managing memory pages in a computing system running one or more virtual machines, the operation comprising:

determining an age of each of a plurality of compressed pages identified in a first-in, touch-out (FITO) list, wherein the FITO list comprises a list of compressed pages stored in a compression cache, and wherein each compressed page corresponds to a memory page of a virtual machine that has been compressed and stored in the compression cache; and adjusting a size of the compression cache based on the determined ages of the plurality of pages in the compression cache.

14. The computer-readable storage medium of claim 13, wherein adjusting the size of the compression cache comprises reducing the size of the compression cache.

15. The computer-readable storage medium of claim 14, wherein determining the age of each of a plurality of compressed pages identified in the FITO list, comprises determining that one or more entries at a beginning of the FITO list differ in age from one or more entries at an ending of the FITO list by more than a specified amount.

16. The computer-readable storage medium of claim 15, wherein the operation further comprises, removing pages corresponding to the one or more entries at the ending of the FITO list from the compression cache for storage in a swap file.

17. The computer-readable storage medium of claim 16, wherein the swap file is within a swap-device that comprises one of a hard disk drive, a solid-state drive, a flash memory component, a NAS, a SAN or other network storage device.

18. The computer-readable storage medium of claim 13, wherein adjusting the size of the compression cache comprises increasing the size of the compression cache.

19. The computer-readable storage medium of claim 18, wherein determining the age of each of a plurality of compressed pages identified in the FITO list comprises determining that one or more entries at a beginning of the FITO list differ in age from one or more entries at an ending of the FITO list by less than a specified amount.

20. The computer-readable storage medium of claim 13, wherein the FITO list orders pages based on the age of the compressed pages stored in the compression cache.

21. The method of claim 13, wherein the compression cache is stored in a device separate from a system memory storing the memory pages.

22. A non-transitory computer-readable storage medium storing a program, which, when executed by a processor performs an operation for managing memory pages in a computing system running one or more virtual machines, the operation comprising:

setting a target condition of memory allocation for a virtual machine;

adjusting a size of a balloon driver running within the virtual machine, wherein the size of the balloon driver determines consumption of memory allocated to the virtual machine, the adjusted size of the balloon driver calculated to achieve a first portion of the target condition of memory allocation for the virtual machine; and adjusting a size of a compression cache of the virtual machine, wherein the compression cache stores compressed memory pages for access by a guest operating system of the virtual machine, the adjusted size of the compression cache calculated to achieve a remaining portion of the target condition of memory allocation for the virtual machine, wherein the first portion and the remaining portion together achieve the target condition of memory allocation for the virtual machine.

23. A system, comprising:

a processor; and a memory, wherein the memory includes one or more virtual machines and a hypervisor application program, the hypervisor configured to perform an operation for managing memory pages allocated to the one or more virtual machines, the operation comprising:

determining an age of each of a plurality of compressed pages identified in a first-in, touch-out (FITO) list, wherein the FITO list comprises a list of compressed pages stored in a compression cache, and wherein each compressed page corresponds to a memory page of a virtual machine that has been compressed and stored in the compression cache; and adjusting a size of the compression cache based on the determined ages of the plurality of pages in the compression cache.

24. The system of claim 23, wherein adjusting the size of the compression cache comprises reducing the size of the compression cache.

25. The system of claim 24, wherein determining the age of each of a plurality of compressed pages identified in the FITO list, comprises determining that one or more entries at a beginning of the FITO list differ in age from one or more entries at an ending of the FITO list by more than a specified amount.

26. The system of claim 25, wherein the operation further comprises, removing pages corresponding to the one or more entries at the ending of the FITO list from the compression cache for storage in a swap file.

27. The system of claim 26, wherein the swap file is within a swap-device that comprises one of a hard disk drive, a solid-state drive, a flash memory component, a NAS, a SAN or other network storage device.

28. The system of claim 23, wherein adjusting the size of the compression cache comprises increasing the size of the compression cache.

29. The system of claim 27, wherein determining the age of each of a plurality of compressed pages identified in the FITO list comprises determining that one or more entries at a beginning of the FITO list differ in age from one or more entries at an ending of the FITO list by less than a specified amount.

30. The system of claim 23, wherein the FITO list orders pages based on the age of the compressed pages stored in the compression cache.

31. The system of claim 23, further comprising a solid state storage device, wherein the solid state storage device stores the compression cache.

32. A system, comprising:

a processor; and a memory, wherein the memory includes one or more virtual machines and a hypervisor application program, the hypervisor configured to perform an operation for managing memory pages allocated to the one or more virtual machines, the operation comprising:

determining a need for an increased amount of memory in a virtual machine of the one or more virtual machines;

adjusting a size of a balloon driver running within the virtual machine, wherein the size of the balloon driver determines consumption of memory allocated to the virtual machine, the adjusted size of the balloon driver achieving a first portion of the increased amount of memory; and adjusting a size of a compression cache of the virtual machine, wherein the compression cache stores compressed memory pages for access by a guest operating system of the virtual machine, the adjusted size of the compression cache calculated to achieve a remaining portion of the increased amount of memory, wherein the first portion and the remaining portion together comprise the increased amount.

\* \* \* \* \*